United States Patent Office 2,914,507
Patented Nov. 24, 1959

2,914,507

EPOXY ETHERS OF POLYHYDROXY-POLYHYDROCARBYL-SUBSTITUTED BENZENES AND THEIR POLYMERS

Robert W. Martin, Lafayette, Calif., assignor to Shell Development Company, New York, N.Y., a corporation of Delaware No Drawing. Application December 14, 1955
Serial No. 552,965

13 Claims. (Cl. 260—47)

This invention relates to a new class of epoxy ethers and to a method for their preparation. More particularly, the invention relates to new epoxy ethers of certain poly(hydrocarbyl) benzene compounds, and to the utilization of the epoxy ethers, particularly in the preparation of pottings and castings and in the preparation of improved coating compositions.

Specifically, the invention provides new and particularly useful polyepoxy polyethers comprising polyether of epoxy monohydric alcohols and polyhydric compounds possessing at least one benzene ring substituted with from 3 to 4 hydrocarbyl side chains.

As a special embodiment, the invention provides glycidyl ethers of polyhydric phenols and polyhydric alcohols possessing a structural unit

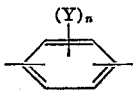

wherein Y is a hydrocarbon radical and preferably an alkyl radical and n is 3 to 4.

As a further special embodiment, the invention provides higher molecular weight hydroxy-substituted glycidyl polyethers of polyhydric materials possessing a plurality of structural units as noted above, such as may be prepared by varying the proportions of reactants or by further reaction of the above-noted novel polyepoxy polyethers with polyepoxides as described hereinafter.

Polymers of the above-described low and high molecular weight polyether polyepoxides are also provided by the present invention.

It is an object of the invention to provide a new class of epoxy ethers. It is a further object to provide new epoxy ethers of poly(hydrocarbyl)benzene substituted polyhydric alcohols and phenols and a method for their preparation. It is a further object to provide epoxy ethers of poly(hydrocarbyl)benzene substituted alcohols and phenols that are particularly useful and valuable in the chemical and related industries. It is a further object to provide polyepoxy polyethers from poly(hydrocarbyl)-benzene substituted alcohols and phenols that are valuable in the preparation of pottings and castings, particularly for electrical apparatus. It is a further object to provide new polyether polyepoxides that can be cured to produce products having improved durability and resistance to decomposition. It is a further object to provide new polyether polyepoxides that can be cured to form films that are hard, flexible and durable. It is a further object to provide new epoxyethers that may be used as improved stabilizers for halogen-containing polymers. Other objects and advantages of the invention will be apparent from the following detailed description thereof.

It has now been discovered that these and other objects may be accomplished by the novel polyepoxy polyethers of the invention comprising polyethers of epoxy monohydric alcohols and polyhydric compound possessing at least one benzene ring substituted with from 3 to 4 hydrocarbyl side chains. It has been found that these above-described polyether polyepoxides and the higher molecular weight derivatives possess unexpected beneficial properties due to their unique structural features, such as having the benzene ring or rings having substantial and preferably all of the ring carbon atoms attached to carbon. It has been found, for example, that these epoxy ethers may be cured in the presence of epoxy-curing agents, such as metal salts, hydrogen fluoride complexes, amines and polycarboxylic acids, to form hard chemical resistant resinuous products having durability and resistance to deterioration. These products thus have the hardness and chemical inertness of the cured products of the glycidyl ethers of the unsubstituted phenols but in addition possess unexpected resistance to deteriorating elements which attack the molecule through the hydrogen attached to the benzene ring.

The polyhydric compounds possessing at least one benzene ring substituted with from 3 to 4 hydrocarbyl side chains used in the preparation of the novel epoxy ethers of the present invention may be polyhydric alcohols or polyhydric phenols having one or more units of the structure

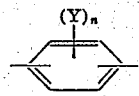

wherein Y is a hydrocarbon radical and n is 3 to 4.

Preferred polyhydric alcohols of this type are those of the formulae

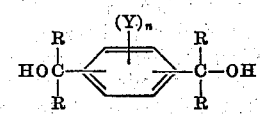

and

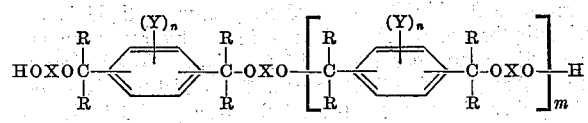

wherein Y is a monovalent hydrocarbon radical, X is a bivalent organic radical, R is hydrogen or a hydrocarbon radical, n is 3 to 4 and m is an integer from 0 to 50. Examples of such alcohols include, among others, 1,4-bis(beta - hydroxyethoxymethyl) tetramethylbenzene, 1,4 - bis(2,3 - dihydroxypropoxymethyl) tetramethylbenzene, 1,4 - bis(2,6 - dihydroxyhexyloxymethyl) tetramethylbenzene, 1,4 - bis(4 - hydroxybutoxymethyl) tetramethylbenzene, 1,3 - bis(2,3 - dihydroxypropoxymethyl) tetramethylbenzene, 1,4 - bis(beta - hydroxyethoxymethyl) tetrabutylbenzene, 1,4-bis(4,5 - dihydroxyheptyloxymethyl) tetrabutylbenzene, 1,4-bis(4-hydroxybutoxymethyl) tetrahexylbenzene, 1,3 - bis(2,3,5 - trihydroxydecyloxymethyl) tetraethyl benzene and 1,3-bis(3-hydroxypentoxy - 1 - ethyl) tetrahexylbenzene. Particularly preferred members of this group are those of the formulae

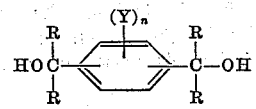

and

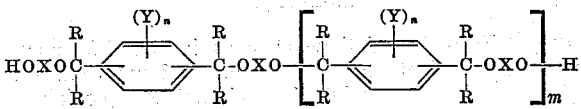

wherein Y is a monovalent alkyl radical containing no more than 8 carbon atoms, X is a bivalent hydrocarbon radical which may be substituted with from 1 to 4 hydroxy groups and contains no more than 18 carbon carbon atoms and R is hydrogen or alkyl radical and $m$ is an integer from 1 to 30.

Other examples of the above-described poly(hydrocarbyl)benzene substituted alcohols and a method for their preparation may be found in my copending application Serial No. 552,964 filed December 14, 1955.

Also preferred are the polyhydric phenols having one or more of the above described units. Especially preferred are the polyhydric phenols of the formula

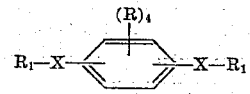

wherein R is an alkyl radical containing up to 8 carbon atoms, such as, for example, methyl, ethyl, propyl, butyl, octyl, heptyl, 3-4-dimethylhexyl, and the like, X is an alkylene radical containing up to 6 carbon atoms and $R_1$ is a phenol of the formula

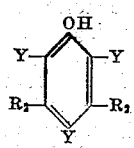

wherein one Y is the free bond of the phenol radical and the other Y's and $R_2$'s are members of the group consisting of hydrogen, halogen and alkyl radicals containing up to 8 carbon atoms. Examples of these phenols include, among others, 1,4-bis[(4-hydroxyphenyl)methyl] tetramethylbenzene, 1,4 - bis[(4 - hydroxyphenyl)ethyl] tetraisopropylbenzene, 1,4 - bis[1 - (4 - hydroxyphenyl)-propyl] 2,3,5 - triethylbenzene, 1,4 - bis[1 - (4 - hydroxyphenyl)butyl] tetraoctyl benzene, 1,4-bis[1-(4-hydroxyphenyl)propyl] tetraisobutyl benzene, 1,4-bis[(2-hydroxy - 4 - butylphenyl)ethyl] tetramethylbenzene, 1,3-bis[(4 - hydroxyphenyl)methyl] tetramethylbenzene, 1,3-bis[(2,4-dihydroxyphenyl)ethyl] tetraoctyl benzene, 1,2-bis[1 - (2,4 - dihydroxyphenyl)butyl] tetrahexyl benzene, 1,2 - bis[(2,4 - dihydroxyphenyl)methyl] 3,4,5-trimethylbenzene, 1,2 - bis[1 - (2,4 - hydroxyphenyl)-methyl] tetraoctyl benzene, 1,2,5 - tris[1 - (4 - hydroxyphenyl)ethyl] trimethylbenzene, 1,4 - bis[1 - (4 - hydroxyphenyl)methyl] trimethylbenzene, 1,3,5-tris[(2-hydroxy - 4 - butylphenyl)methyl] tributyl benzene, 1,3-bis[(2,3 - dihydroxyphenyl)methyl] tetramethylbenzene, 1,3 - bis[1 - (2,3 - dihydroxyphenyl)ethyl] tetraisopropylbenzene, 1,3 - bis[(2,3 - dihydroxy - 4 - butylphenyl)methyl] tetrabutylbenzene, 1,4-bis[1-(2,4-dihydroxy - 5 - butylphenyl)ethyl] tetramethylbenzene, 1,4-bis[(2,4 - dihydroxyphenyl)methyl] tetramethylbenzene, 1,4 - bis[(2,3 - dihydroxyphenyl)ethyl] tetrabutylbenzene, 1,2 - bis[1 - (2,3 - dihydroxyphenyl)butyl] tetraoctyl benzene, 1,3 - bis[1 - (2 - hydroxy - 5 - chlorophenyl)methyl] tetraoctyl benzene, 1,4-bis[1-(2-hydroxy-5,6-dibromophenyl)methyl] tetraoctyl benzene and 1,2-bis[1-(2-hydroxy-5,6-dichlorophenyl)isopropyl] tetraoctyl benzene.

Other examples of the above-described poly(hydrocarbyl) benzene-substituted phenols and a method for their preparation may be found in my copending application Serial No. 473,432, filed December 6, 1954.

The epoxy-substituted alcohols, the novel ethers of which are provided by the present invention, comprise those monohydric alcohols possessing at least one epoxy group, i.e., a

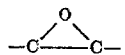

group. Examples of these alcohols include 2,3-epoxypropanol (glycidol), 3,4-epoxybutanol, 2,3-epoxybutanol, 2,3-epoxyhexanol, epoxidized octadecadienol, epoxidized dodecadienol, epoxidized tetradecadienol, 3,4-epoxydihydropyran-5-propanol, 2,3-dimethyl-4,5-epoxyoctanol, 2-methoxy-4,5-epoxyoctanol, 3,4-epoxy-5-chlorocyclohexanol, 2,3-epoxypropoxypropanol, 2,3-epoxypropoxyhexanol, 2,3 - epoxypropoxy - 2,3 - dihydroxyheptanol, 2,3-epoxydodecanol and 4-chloro-5,6-epoxydodecanol.

Preferred epoxy-substituted alcohols are the epoxy-substituted aliphatic and cycloaliphatic monohydric alcohols containing from 3 to 15 carbon atoms, such as 2,3 - epoxypropanol, 3,4 - epoxybutanol, 3,4 - epoxydodecanol, 2-methyl-2,3-epoxypropanol, 2,3-epoxycyclohexanol, 2,3-epoxypropoxyethanol, 2,3-epoxypropoxyoctanol, and the like.

Particularly preferred epoxy-substituted alcohols are the epoxyalkanols, epoxyalkoxyalkanol, epoxycycloalkanols and epoxyalkoxycycloalkanols, and particularly those containing not more than 12 carbon atoms, such as 2,3-epoxypropanol, 3,4-epoxyhexanol, 2,3-epoxypropoxyoctanol, 2,3-epoxy-5-octanol, 2,3-epoxy-6-dodecanol, 2,3-epoxypropoxy-5-octenol, 3,4-epoxycyclohexanol, 2,3-epoxypropoxy-4-cyclohexanol, and the like.

Of special interest are the monoepoxy-substituted alkanols containing from 3 to 8 carbon atoms and having the epoxy group in the terminal position. 2,3-alkanols, such as 2,3-epoxypropanol, are of particular interest, particularly because of the ease of preparation of their ethers as well as the superior properties possessed by such esters.

The ethers may be obtained by various methods. The epoxy ethers of the poly(hydrocarbyl)benzene substituted phenols are preferably obtained by reacting the phenol with an epoxy-halo-substituted alkane or a dihalo-hydroxy-substituted alkane in an alkaline medium.

The expression "halo-epoxy-substituted alkanes" as used herein refers to those alkanes having a 1,2-epoxy group, i.e., a

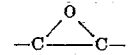

group attached directly to a halogen-bearing carbon atom, such as, for example, epichlorohydrin, epibromohydrin, 1,4-dichloro-2,3-epoxybutane, 1-chloro-2,3-epoxypentane, and the like. The expression "dihalo-hydroxy-substituted alkanes" as used herein refers to those alkanes having a series of three carbon atoms one of which is attached to a halogen atom, the next is attached to a hydroxyl group and the last is attached to a halogen atom, such as, for example, 1,3-dichloro-2-hydroxypropane, 2,4-dibromo - 3 - hydroxypentane, 2,3-dichloro-3-hydroxybutane, and the like. Epichlorohydrin comes under special consideration because of its low cost and because of the superior properties of the epoxides obtained therefrom.

The amount of the phenol and epoxy-forming material to be employed in this reaction will vary depending upon the type of product desired. If simple monomeric type products are desired, the phenol and epoxy-forming material are preferably reacted in chemically equivalent ratios varying from 1:4 to 1:8. If higher molecular weight hydroxy-containing products are desired, the epoxy-forming materials are used in smaller amounts and the phenol and epoxy-forming materials are reacted in chemical equivalent ratios varying from 2:1 to 1.8:1. As used herein, "chemical equivalent" amount refers to the amount needed to furnish one OH group for every epoxy group.

High molecular weight products prepared from the phenols and epichlorohydrin by varying the reactants as indicated above are preferably those of the formula

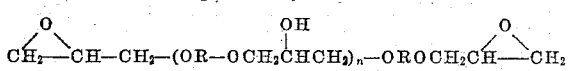

wherein R is the residue of the phenol obtained by removing the two OH groups, and $n$ is an integer from 0 to 5.

The desired alkalinity is obtained by adding basic substances, such as sodium or potassium hydroxide. The alkali is employed in at least chemical equivalent amounts, e.g., one mole of alkali for every epoxy group to be reacted, and is preferably utilized in excess of the epoxy-halo-substituted alkane.

The above reaction is preferably conducted by heating the mixture at temperatures ranging from about 50° C. to 150° C., and more preferably from about 80° C. to 125° C. Atmospheric, superatmospheric, or subatmospheric pressures may be utilized as desired.

The water formed in the reaction may be removed during or at the end of the reaction. At the completion of the reaction, the water and excess reactants, such as excess halo-epoxy-substituted alkanes are preferably removed by distillation and the residue that remains then treated with an appropriate solvent, such as benzene, and filtered to remove the salt. The product that remains may then be purified by any suitable method, such as distillation, extraction, and the like.

The epoxy ethers of the poly(hydrocarbyl) benzene-substituted alcohols having the —$CH_2OH$ attached directly to the ring, such as, for example, 1,4-bis(hydroxy methyl) tetramethylbenzene, are preferably obtained by reacting the alcohol with a monochlorohydrin, and then dehydrohalogenating the resulting product. Examples of such monochlorohydrins include, among others glycerol monochlorohydrin, hexanetriol monochlorohydrin, the monochlorohydrin of 1,2,3-octanetriol and the like.

The epoxy ethers of the poly(hydrocarbyl) benzene substituted alcohols wherein the OH is further removed from the benzene ring, such as those having the OH in a grouping as —$CH_2OXOH$, require a different procedure. These ethers are prepared by reacting the alcohol with a material of the group consisting of halo-epoxy-substituted alkanes and dihalo-hydroxy-substituted alkanes in the presence of a catalyst, such as an acid-acting catalyst, and then dehydrohalogenating the resulting product. The halo-epoxy-substituted alkanes and dihalo-hydroxy-substituted materials used in this reaction are the same as those described above for the reaction in the alkaline medium.

The proportion of the poly(hydrocarbyl) benzene-substituted alcohols and the epoxy-forming material used in preparing the novel polyether polyepoxides of the invention may vary over a considerable range depending upon the type of products desired. If all of the hydroxyl groups on the alcohol molecule are to be etherified with the epoxy alcohol, the alcohol is combined with at least a chemical equivalent amount of the epoxy-forming material, and more preferably, with from 1.1 to 3 equivalents of the epoxy-forming material. As used herein in reference to the alcohols and epoxy-forming materials, the expression "chemical equivalent amount" refers to that amount needed to furnish one epoxy or halogen for every hydroxyl group. If products having residual hydroxyl groups are desired, the alcohol should, of course, be combined with less than a chemical equivalent amount of the epoxy-forming material, such as from .9 to .5 equivalent of the epoxy-forming material.

The catalysts used in the reaction in case the alcohol is one wherein the OH is not attached directly to the ring through the $CH_2$ group include condensation catalysts, such as acid-type catalysts including HF, $H_2SO_4$, $H_3PO_4$, salts, such as $SnCl_4$, and $BF_3$ ether complexes. The concentration of the catalyst will vary depending upon the individual catalyst. In general, the catalysts are employed in amounts varying from about .1% to about 5% by weight of the reactants. The more active catalysts, such as the $BF_3$ complexes, are preferably employed in amounts varying from about .1% to about 1% while the less active catalysts, such as $SnCl_4$, are preferably used in amounts varying from about .5% to about 4%, as indicated in U.S. 2,260,753, and U.S. 2,380,185.

The condensation may be effected in the presence or absence of solvents or diluents. In most cases, it is preferred to employ a solvent, such as cyclohexane, benzene, tetrahydrofuran, and the like.

Temperatures generally range from about 25° C. to 150° C., and more preferably, between 50° C. and 120° C. In general, the higher temperatures give darker products and are less preferred than the lower temperatures.

The condensation may be carried out in a variety of ways. The two reactants may be mixed at room temperature and the catalyst then added, or the catalyst may be added to one reactant and the other reactants added to that mixture.

The product obtained by reacting the poly(hydrocarbyl) benzene-substituted alcohols with the epoxy-forming material is then treated with an alkaline material to dehydrohalogenate the said product. This treatment may be accomplished by adding the alkaline material to the reaction mixture obtained in the above-described process, or the condensation product may be recovered from the reaction mixture by any suitable means, such as crystallization, extraction, and the like, before it is combined with the alkaline material. Any of the known dehydrohalogenating materials may be used in this reaction, such as sodium and potassium hydroxide, sodium and potassium carbonates and bicarbonates, borax, hydroxides or magnesium, zinc, lead, iron and aluminum, and the corresponding oxides, etc. The aluminates, silicates and zincates of alkali salts, such as sodium and potassium aluminate and sodium and potassium zincate, are particularly good dehydrohalogenating agents when used in substantially, or completely, non-aqueous media.

The amount of the dehydrohalogenating agent used may vary over a considerable range. If all of the

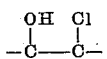

groups are to be converted to epoxy groups, the halohydrin should be reacted with an amount of the alkaline material which is at least equivalent to the hydrogen halide content of that halohydrin. Thus, if all of the halohydrin groups on the condensation product of epichlorohydrin and 1,4-bis(β-hydroxyethoxymethyl) tetramethyl

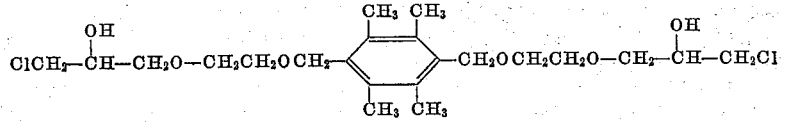

benzene are to be converted to epoxy groups, the above product should be reacted with approximately 2 moles of the alkaline material. Less than the equivalent amount of the alkaline material may be used if all of the halohydrin groups are not to be converted to the epoxy groups.

In most cases, the alkaline material may be applied to the halohydrin as an aqueous solution or suspension or dissolved in an inert solvent, such as ethers, esters, hydrocarbons, halogenated hydrocarbons, and the like. If the above-noted aluminates, silicates or zincates are used as the alkaline material, the dehydrohalogenation is preferably effected in a non-aqueous medium and the salts as by themselves or suspended in organic solvents or diluents. Carbon tetrachloride, 1,4-dioxane and dichloroethyl ether are particularly satisfactory as solvents for this purpose.

In most cases, the dehydrohalogenation reaction is initiated on contact of the reactants at room temperature. The reaction is exothermic and sufficient heat is usually liberated to permit one to conduct the reaction at the desired temperature without resort to the use of external heating means. In some cases, it may be desirable to cool the reaction mixture during the contacting of the reactants. If reaction is conducted in the presence of water, it is generally preferred to maintain the temperature below about 50° C. to prevent hydrolysis of the epoxide groups. If the above-described aluminates, silicates and zincates are used as the alkaline material in a non-aqueous system, higher temperatures may be employed, such as those of the order of about 50° C. to 110° C. With this latter group of catalysts, the preferred temperatures generally range from about 30° C. to about 80° C.

At the end of the reaction period, the reaction mixture is then filtered through a suitable filtering medium, e.g., diatomaceous earth, to remove the alkali metal halide and any excess catalyst. The filtrate is then treated to recover the epoxide. If the reaction has been conducted in the presence of water, care should be taken to avoid hydrolysis of the epoxide groups during the separation process. This can be accomplished by various extraction or distillation methods using subatmospheric pressures and conditions unfavorable to hydrolysis of the epoxide groups. Separation may be conveniently effected by treating the aqueous reactant mixture in a continuous extraction apparatus wherein any suitable extractant such as an ester, alcohol, ether, hydrocarbon, etc., may be utilized. The extracted epoxide may be separated from its solution with the extractant by subjecting the preferably anhydrous solution to distillation or fractionation operation.

In the case where the reaction has been conducted in the absence of water but in the presence of solvents, as is preferably the case with the above-described aluminates, silicates and zincates, the novel polyepoxy polyethers may be recovered by any suitable method, such as distillation, extraction, and the like. If no solvent or diluent is employed, the polyether polyepoxide may be recovered and purified by any convenient method, such as distillation under reduced pressure, extraction, fractional precipitation, and the like.

Special polyether polyepoxides coming under the scope of the present invention may also be prepared by heating and reacting a mole of the above-described poly(hydrocarbyl) benzene-substituted alcohols with two moles of a polyepoxide, such as, for example, those described in U.S. 2,365,488.

The polyether polyepoxides of the invention, such as described above, are fluid or viscous liquids to semi-solids. They have at least two epoxy groups per molecule and are substantially free of chlorine, i.e., contain less than 1% or 3% chlorine. The polyether polyepoxides are, in general soluble in most solvents, such as ketones, alcohols and liquid hydrocarbons, and are compatible with many synthetic oils and resins.

For certain applications, such as in the preparation of polymeric products, it is sometimes desirable to have higher molecular weight hydroxy-containing polyether polyepoxides. Such products may be obtained by varying the amount of the poly(hydrocarbyl) benzene-substituted phenols and halo-epoxy-substituted alkane in the alkaline medium, as described above, or by reacting the above-described polyether polyepoxides with polyhydric compounds. In this case, the polyhydric compound reacts with the

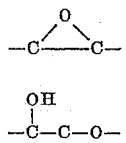

group to form $$-C-C-O-$$
$$\phantom{-C-}|\phantom{-O-}$$
$$\phantom{-C-}OH$$

groupings. Higher molecular weight products may be obtained from diglycidyl ether of 1,4-bis(2-hydroxy ethoxymethyl) tetramethylbenzene, for example, by reacting X moles of that compound with one mole of a polyhydric phenol having X OH groups. Such products have the formula

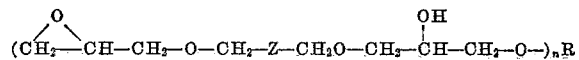

wherein Z is the residue of the 1,4-bis(2-hydroxyethoxymethyl) tetramethylbenzene, R is the residue of the polyhydric phenol and $n$ is an integer representing the number of OH groups on the polyhydric phenol molecule. Polyhydric compounds used for this purpose may be any of the above-described poly(hydrocarbyl) benzene-substituted alcohols or polyhydric phenols. Polyhydric phenols that may be used for this purpose include, among others, resorcinol, catechol, hydroquinone, methyl resorcinol, polynuclear phenols, such as 2,2-bis(4-hydroxyphenyl)-butane.

In case the polyhydric material employed in the above reaction is a poly(hydrocarbyl) benzene-substituted polyhydric phenol, the reaction may generally be accomplished by merely heating the polyether polyepoxide prepared from the poly(hydrocarbyl) benzene-substituted alcohol or phenol with the phenol. In the case of polyhydric alcohols, such as other poly(hydrocarbyl) benzene-substituted polyhydric alcohols, the reaction is usually quite slow and it is advisable to employ a catalyst, such as the above-described condensation catalysts employed for the reaction of the epoxy-forming material with the poly(hydrocarbyl) benzene-substituted alcohols. The condensation reaction may be effected under the same conditions as those shown above for reacting the epoxy-forming material with the poly(hydrocarbyl) benzene-substituted alcohols, e.g., the reaction may be conducted in the presence or absence of solvents or diluents and may be conducted at temperatures generally ranging from about 25° C. to 150° C. In case of the polyhydric phenols, preferred temperatures range from about 50° C. to about 80° C. With the other polyhydric materials, preferred temperatures range from about 40° C. to 120° C.

If the resulting higher molecular weight products possess less than the desired number of epoxy groups, such as may be the case when the dihydric material is reacted with less than a double molar quantity of the polyether polyepoxide prepared from the poly(hydrocarbyl) benzene-substituted polyhydric alcohol, additional epoxy groups may be introduced by reacting the higher molecular weight product with additional quantities of the epoxy-forming material, e.g., quantities such as would furnish one epoxy group of each of the OH groups of the polyhydric material to be reacted. Thus, if the higher molecular weight product was obtained by reacting one mole of the polyether polyepoxide of the poly(hydrocarbyl) benzene-substituted alcohol with two moles of a dihydric phenol, the resulting higher molecular weight product would then be reacted with approximately two moles of the epoxy-forming material. The halohydrin obtained would then be dehydrohalogenated according to the above-described procedure used for preparing the polyether polyepoxides of the poly(hydrocarbyl) benzene-substituted alcohols themselves. The higher molecular weight products produced by the above method vary from viscous liquids to solids having relatively high melting points. They possess active epoxy groups as well as hydroxyl groups and may be cured or undergo further reaction through either of these functional groups.

The poly(hydrocarbyl) benzene-substituted epoxides or their higher molecular weight derivatives produced as shown in the preceding paragraph may be polymerized through the epoxy group to form valuable polymeric products. They may be polymerized alone or with other polyepoxide materials in a variety of different proportions, such as, for example, with amounts of other polyepoxides varying from 5% to 95% by weight. Polyepoxides that may be copolymerized with these poly(hydrocarbyl) benzene-substituted epoxides and higher molecular weight products include, among others, glycidyl polyethers of polyhydric phenols obtained by reacting polyhydric phenols, such as bis-phenol, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides. The glycidyl polyethers of polyhydric phenols obtained by condensing the polyhydric phenols with epichlorohydrin as described above are also referred to as "ethoxyline" resins. See Chemical Week, vol. 69, page 27, for September 8, 1951.

A great variety of different curing agents may be employed in effecting the above-described homo- and co-polymerization. Such agents include, among others, carboxylic acids or anhydrides, such as formic acid, oxalic acid, or phthalic anhydride; Friedel-Crafts metal halides, such as aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; amino compounds, such as triethylamine, ethylene diamine, diethylamine, diethylene triamine, triethylene tetraamine, dicyandiamide, melamine; and salts of inorganic acids, such as zinc fluoborate, potassium persulfate, nickel fluoborate, and magnesium perchlorate.

The amount of the curing agents employed may vary over a considerable range depending upon the agent selected. With curing agents having replaceable hydrogen, such as the amine agents, amounts of agent employed vary up to and including equivalent proportions, i.e., sufficient curing agent to furnish a replaceable hydrogen atom for every epoxy group to be reacted. In most cases, satisfactory cures are obtained with amounts varying from 1% to 25% by weight of the material being polymerized. With the phosphoric acid and esters, particularly preferred amounts vary from about 1% to 10% by weight. The amino compounds are preferably employed in amounts varying from about 3% to 25% and the salts of the inorganic acids, such as the salts of fluoboric acid, are preferably employed in amounts varying from about 3% to 20% by weight. The other curing agents are preferably employed in amounts varying from 1% to 20%.

The higher molecular weight hydroxy-containing ethers may also be cured through the hydroxy group by the addition of appropriate amounts, e.g., 1% to 25% by weight of polybasic acids or anhydrides, polyisocyanates, and the like.

The polymerization is preferably effected by mixing the curing agent with the polyepoxide and heating the mixture together, preferably at temperature ranging from about 40° C. to 200° C. Solvents or diluents may be employed in the polymerization depending upon the intended application of the polymer and ease of operation of the polymerization reaction.

If the polyether polyepoxides of the poly(hydrocarbyl) benzene-substituted alcohols or phenols and their higher molecular weight derivatives are to be used in the preparation of castings or pottings, the curing agent and the epoxy material are generally combined together and then poured into the desired mold or casting containing the electrical wires or apparatus and the mixture heated to effect the cure.

The polyether polyepoxides of the poly(hydrocarbyl) benzene-substituted alcohols and phenols and their higher molecular weight derivatives may also be employed with the afore-described curing agents to prepare improved surface coating compositions of the air-drying or baking type. In utilizing the products for this application, it is generally desirable to combine the epoxy material and curing agent with the desired solvents, and, if desired, other film-forming materials and driers, and then apply the resulting mixture to the surface to be coated. Film-forming materials that can be used with the epoxy material in this manner include the drying oils, such as tung oil, linseed oil, dehydrated castor oil, soyabean oil, and the like; cellulose derivatives such as cellulose nitrate, cellulose acetate, cellulose acetate butyrate, cellulose propionate, ethyl cellulose, and mixtures thereof; and vinyl polymers, such as polymers of vinyl chloride, vinylidene chloride, methyl methacrylate, diallyl phthalate, and the like. The coatings prepared in this manner may be allowed to set to a hard finish at room temperature or heat may be applied to hasten the cure.

The higher molecular weight hydroxy-containing derivatives of the polyether polyepoxides prepared from the poly(hydrocarbyl) benzene-substituted alcohols or phenols described above are particularly suited for use in preparing coating compositions as described above, as they may be reacted through the hydroxyl group or groups with drying oil fatty acids or may be cured through the hydroxyl groups with compounds, such as methylol urea or melamines or diisocyanates.

The polyether polyepoxides of poly(hydrocarbyl) benzene-substituted alcohols or phenols and their higher molecular weight derivatives may also be employed with the curing agents to prepare valuable adhesive and impregnating compositions. In utilizing the products for these applications, it is generally desirable to combine the epoxy material with suitable solvents or diluents, such as benzene, toluene, acetonitrile, and the like, so as to form a spreadable fluid and then the curing agent added and the mixture applied to the desired surface.

In addition to their use in forming the above-described polymeric products, the claimed epoxy ethers and their higher molecular weight derivatives may be used as stabilizing agents for various halogen-containing polymers, and particularly the vinyl halide polymers. These products are compatible with the polymers and in combination therewith give good resistance to discoloration by heat and light. These products may be used as stabilizers, alone or in combination with other stabilizing agents, such as urea and thiourea derivatives. In most cases, the products are effective as stabilizers in amounts varying from about .1% to 5% by weight of the polymer being stabilized. The epoxy materials may be combined with the halogen-containing polymer by any suitable method, such as by dissolving the products in a suitable solvent or by milling the products together on a suitable roll mill.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

*Example I*

This example illustrates the preparation and properties of the diglycidyl ether of bis(hydroxymethyl) tetramethylbenzene.

200 parts of glycerol monochlorohydrin, 200 parts of benzene and 0.25 part of sulfamic acid were charged to a reaction flask equipped with stirrer, thermometer, Stark and Dean trap and condenser. This mixture was heated to reflux for several hours and then cooled. The water which had collected in the Stark and Dean trap was drained off. 19.4 parts of 1,4-bis(hydroxymethyl) tetramethylbenzene was added to the reaction kettle with stirring and the mixture again raised to reflux and maintained there for about one hour and then additional 19.4 parts of 1,4-bis(hydroxymethyl) tetramethylbenzene added and the mixture held at reflux for about 3 more hours. At the end of the reaction, the benzene was distilled off and 0.65 part of NaHCO$_3$ in 20 parts of water was added to the kettle. The reaction mixture was transferred to a distillation kettle and the unreacted glycerol monochlorohydrin vacuum distilled off to a kettle temperature of 120° C. at 2 mm. The cruded product was then recrystallized several times from hot methanol. The resulting product was a white crystalline material having a melting point of 116–118° C. Analysis: Chlorine 18.2%, calc. 18.7%, OH value 0.457 eq./100 g., calc. .53 eq./100 g.

The epoxide of the chlorohydrin was prepared as follows: 18.81 parts of the dichlorohydrin produced above was mixed with 4 parts of sodium hydroxide, 10 parts of water and 50 parts of dioxane and the mixture added to a reaction flask equipped with a stirrer, condenser and thermometer. The mixture was heated at 76° C. to 78° C. for about 2 hours. The mixture was then cooled to room temperature and an equal amount of anhydrous ether added. The mixture was filtered through cotton and then the ether and dioxane distilled off at a kettle temperature of 130° C. under vacuum. The product was a white crystalline solid which had a melting point of 86–89° C. Analysis: Epoxide value 0.531 eq./100 g., chlorine—2.86%, and hydroxyl value 0.037 eq./100 g.

100 parts of the diglycidyl ether produced above was combined with 7 parts of diethylene triamine and heated at 100° C. The resulting product was a hard tough casting having good resistance to solvents and improved durability and resistance to discoloration.

100 parts of the diglycidyl ether produced above was also combined with 50 parts of tetrahydrophthalic anhydride and 1 part of benzyldimethylamine and heated to 100° C. The resulting product was also a hard tough casting having excellent resistance to solvents and improved durability.

Example II

Glycidyl ethers having properties related to the product produced in Example I are obtained by replacing the 1,4-bis(hydroxymethyl) tetramethyl benzene in the above-described preparation process with equivalent amounts of each of the following: 1,4-bis(hydroxymethyl) 2-ethyl 3,5,6-trimethylbenzene, 1,3-bis(hydroxymethyl) tetramethyl benzene and 1,4-bis(hydroxymethyl) tetraethyl benzene.

Example III

This example illustrates the preparation and properties of the diglycidyl ether of 1,4-bis(hydroxyphenylmethyl) tetramethylbenzene.

1 mole of 1,4-bis(hydroxyphenylmethyl) tetramethylbenzene was dissolved in 10 mole of epichlorohydrin. The mixture was heated for 30 minutes and toluene added. The temperature was then raised to temperature of about 110° C. and 0.2 mole of sodium hydroxide added. At the end of the reaction, the salt was filtered off and the mixture distilled. The resulting product was a light colored solid identified as the diglycidyl ether of 1,4-bis(hydroxyphenylmethyl) tetramethylbenzene plus some polymer, epoxy V, .343 eq./100 g., mol. weight 504, softening point about 50° C.

When the above resin was heated with 5 parts per 100 parts of the resin of 2,4,6-tris(dimethylaminomethyl) phenol the product was a tough casting which was less brittle than one prepared from diglycidyl ether of 2,2-bis (hydroxyphenyl) propane.

When the above resin was heated with 50 parts per 100 parts of the resin of hexahydrophthalic anhydride and 1 part per 100 parts of dimethylethanol amine, the product was a hard tough casting having a Barcol hardness of 18.

Example IV

This example illustrates the preparation and properties of the diglycidyl ether of 1,4-bis((2-hydroxy-5-chlorophenyl) methyl) tetramethyl benzene.

15 parts of 1,4-bis((2-hydroxy-5-chlorophenyl)methyl) tetramethyl benzene and 100 parts of epichlorohydrin were charged to a reaction flask equipped with stirrer, dropping funnel, thermometer and phase separator. The phase separator was equipped with a condenser and thermometer. The mixture was heated for 30 minutes and then 25 parts of toluene added. The temperature was then raised to kettle temperature of 114° C. and caustic (3 parts of sodium hydroxide dissolved in 6 parts of water) was added through the dropping funnel. The temperature in the kettle rose to 117° C. during this operation. The salt was filtered off and the toluene and epichlorohydrin distilled off. A vacuum was applied and the material in the kettle crystallized. The product was recrystallized from boiling toluene. It was a white crystalline solid having a melting point of 190–195° C. Analysis: epoxy value 0.300 eq./100 g., hydroxyl value 0.104 eq./100 g. and mol. wt. of 468.

100 parts of the diglycidyl ether produced above was combined with 7 parts of diethylene triamine and heated at 100° C. The resulting product was a hard tough casting having good resistance to solvents and improved durability and resistance to discoloration.

100 parts of the diglycidyl ether produced above was also combined with 50 parts of tetrahydrophthalic anhydride and 1 part of benzyldimethylamine and heated to 100° C. The resulting product was also a hard tough casting having good resistance to solvents and improved durability.

Example V

Diglycidyl ethers having properties related to the products produced in Example III are obtained by replacing the 1,4-bis((2-hydroxy-5-chlorophenyl)methyl) tetramethylbenzene with equivalent amounts of each of the following: 1,4-bis((2-hydroxy-3-tert-butyl-5-methylphenyl)methyl) tetramethylbenzene and 1,4-bis((2-hydroxy-3-tert-butyl-5-ethylphenyl)methyl) tetramethylbenzene.

Example VI

This example illustrates the preparation and properties of a diglycidyl ether of 1,4-bis(beta-hydroxyethoxymethyl) tetramethylbenzene.

28 parts of 1,4-bis(beta-hydroxyethoxymethyl) tetramethyl benzene are placed in a reaction flask and heated. Sufficient BF$_3$-ethyl ether are added to bring the pH to about 1.0 and then 200 parts of epichlorohydrin added dropwise. After all the epi has been added, the reaction is continued for about 20 minutes to assure complete reaction. The resulting product is then dissolved in dioxane containing sodium aluminate. While agitating, the mixture is heated and refluxed for 10 hours. After cooling the insoluble material is filtered from the reaction mixture and low boiling substances removed by distillation. The product is a white crystalline solid identified as the diglycidyl ether of 1,4-bis(beta-hydroxyethoxymethyl) tetramethylbenzene.

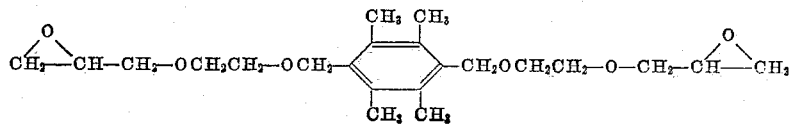

100 parts of the diglycidyl ether produced above is combined with 7 parts of diethylene triamine and heated at 100° C. The resulting product is a hard tough casting having good resistance to solvents and improved durability and resistance to discoloration.

*Example VII*

75 parts of the diglycidyl ether of 1,4-bis((2-hydroxy-5-chlorophenyl)methyl) tetramethylbenzene is combined with 25 parts of diglycidyl ether of 2,2-bis(4-hydroxyphenyl) propane and 10 parts of diethylene triamine and the mixture heated to 100° C. The resulting product is a hard durable casting.

*Example VIII*

50 parts of the diglycidyl ether of 1,4-bis(hydroxymethyl) tetramethylbenzene produced in Example I is combined with 50 parts of diglycidyl ether of resorcinol. Portions of this mixture are combined with 10% by weight of each of the following curing agents: triethylene tetraamine, meta-phenylene diamine and di(aminophenyl) sulfone. These mixtures are heated at 100° C. and in each case form a hard durable casting.

I claim as my invention:

1. A glycidyl ether of a compound of the formula

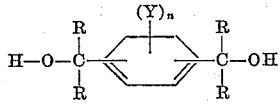

wherein Y is an alkyl radical containing from 1 to 8 carbon atoms, $n$ is an integer from 3 to 4 and R is a member of the group consisting of hydrogen and alkyl radicals.

2. A glycidyl ether of a polyhydric alcohol of the formula

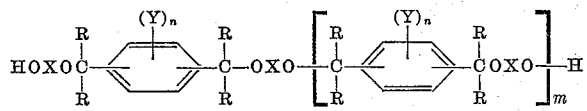

wherein Y is an alkyl radical containing from 1 to 8 carbon atoms, X is a bivalent organic radical having no more than 18 carbon atoms, R is a member of the group consisting of hydrogen and alkyl radicals, $n$ is 3 to 4 and $m$ is an integer from 0 to 50.

3. A glycidyl ether of a bis(1-hydroxyalkyl) tetraalkylbenzene wherein the four alkyl groups on the benzene ring contain from 1 to 8 carbon atoms each.

4. A glycidyl ether of a bis(hydroxyalkoxymethyl) tetraalkylbenzene wherein the four alkyl groups on the benzene ring contain from 1 to 8 carbon atoms each.

5. A glycidyl ether of 1,4-bis(beta-hydroxyethoxy methyl) tetramethylbenzene.

6. A composition of matter comprising a cross-linked insoluble polymer obtained by heating at a temperature between 40° C. and 200° C. the epoxy ether defined in claim 1 with from 1% to 25% by weight of an alkaline catalyst.

7. A composition of matter comprising a cross-linked insoluble polymer obtained by heating at a temperature between 40° C and 200° C. the epoxy ether defined in claim 2 with from 1% to 25% by weight of an alkaline catalyst.

8. A composition of matter comprising a cross-linked insoluble polymer obtained by heating at a temperature between 40° C. and 200° C. and reacting a glycidyl ether of 1,4-bis(beta-hydroxyethoxymethyl) tetramethyl benzene with an approximately chemically equivalent amount of an amine, as used herein chemically equivalent amount being that amount needed to furnish one amino hydrogen per epoxy group.

9. A composition of matter comprising a cross-linked insoluble polymer obtained by heating at a temperature between 40° C. and 200° C. and reacting a glycidyl ether of the compound defined in claim 4 with an approximately chemically equivalent amount of a polycarboxylic acid anhydride, chemically equivalent amount being that amount needed to furnish an anhydride group per epoxy group and an amine accelerator.

10. Compounds of the group consisting of (1) glycidyl ethers of polyhydroxy containing compounds possessing a plurality of terminal aliphatic hydroxyl groups and having a structural group

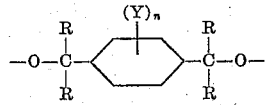

wherein Y is an alkyl group containing from 1 to 8 carbon atoms, $n$ is an integer selected from the group consisting of 3 and 4 and R is a member of the group consisting of hydrogen and alkyl radicals, and (2) glycerol chlorohydrin ethers of the above described polyhydroxy substituted compounds.

11. A glycidyl ether of a 1,4-bis(dihydroxyalkoxymethyl) tetraalkylbenzene wherein the four alkyl groups contain from 1 to 8 carbon atoms each.

12. A glycidyl ether of 1,4-bis(2,3-dihydroxypropoxymethyl) tetramethylbenzene.

13. A composition of matter comprising a cross linked polymer of a glycidyl ether of a polyhydroxy containing compound possessing a plurality of terminal aliphatic hydroxy groups and having a structural group

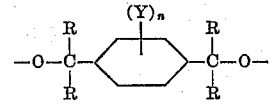

wherein Y is an alkyl group containing from 1 to 8 carbon atoms, $n$ is an integer from 3 to 4 and R is a member of a group consisting of hydrogen and alkyl radicals.

References Cited in the file of this patent

UNITED STATES PATENTS

| | | |
|---|---|---|
| 2,643,244 | Simons | June 23, 1953 |
| 2,739,160 | Bell et al. | Mar. 20, 1956 |